US010666561B2

(12) United States Patent
Song et al.

(10) Patent No.: US 10,666,561 B2
(45) Date of Patent: *May 26, 2020

(54) VIRTUAL MACHINE MIGRATION

(71) Applicant: Hewlett Packard Enterprise Development LP, Houston, TX (US)

(72) Inventors: Xiaoheng Song, Beijing (CN); Guoliang Zheng, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/039,285

(22) Filed: Jul. 18, 2018

(65) Prior Publication Data

US 2018/0351858 A1 Dec. 6, 2018
US 2019/0207846 A9 Jul. 4, 2019

Related U.S. Application Data

(62) Division of application No. 14/768,443, filed as application No. PCT/CN2014/075171 on Apr. 11, 2014, now Pat. No. 10,044,608.

(30) Foreign Application Priority Data

Apr. 16, 2013 (CN) .......................... 2013 1 0132255

(51) Int. Cl.
*H04L 12/46* (2006.01)
*H04L 12/721* (2013.01)
(Continued)

(52) U.S. Cl.
CPC .......... *H04L 45/66* (2013.01); *G06F 9/45558* (2013.01); *H04L 12/4633* (2013.01);
(Continued)

(58) Field of Classification Search
CPC ......... G06F 2009/4557; G06F 9/45558; H04L 12/4633; H04L 12/4641; H04L 45/66;
(Continued)

(56) References Cited

U.S. PATENT DOCUMENTS 8,363,666 B2 1/2013 Donthamsetty et al.
9,164,795 B1 10/2015 Vincent
(Continued)

FOREIGN PATENT DOCUMENTS

CN 101465812 6/2009
CN 102413061 4/2012
(Continued)

OTHER PUBLICATIONS

CN First Office Action dated Dec 14, 2016, CN Patent Application No. 201310132255.9 dated Apr. 16, 2013, State Intellectual Property Office of the P.R. China, 6 pages.
(Continued)

*Primary Examiner* — Steven H Nguyen

(57) ABSTRACT

According to an example, virtual machine (VM) migration may include generating a redundant tunnel between a common edge device (ED) of a plurality of common EDs of a multi-site network (MSN) and a gateway ED of the MSN. A gateway media access control (MAC) address and a static route may be configured for forwarding an Internet protocol (IP) message between the common ED and the gateway ED using the redundant tunnel.

18 Claims, 6 Drawing Sheets

(51) Int. Cl.
  *G06F 9/455* (2018.01)
  *H04L 29/06* (2006.01)
  *H04L 29/12* (2006.01)
(52) U.S. Cl.
  CPC ...... *H04L 12/4641* (2013.01); *H04L 61/2007* (2013.01); *H04L 63/0272* (2013.01); *H04L 69/22* (2013.01); *G06F 2009/4557* (2013.01)
(58) Field of Classification Search
  CPC .. H04L 61/2007; H04L 63/0272; H04L 69/22
  See application file for complete search history.

(56) References Cited

U.S. PATENT DOCUMENTS

| | | |
|---|---|---|
| 2007/0019676 A1 | 1/2007 | Kompella |
| 2011/0090911 A1 | 4/2011 | Hao et al. |
| 2011/0246669 A1 | 10/2011 | Kanada et al. |
| 2012/0054367 A1 | 3/2012 | Ramakrishnan et al. |
| 2012/0176934 A1 | 7/2012 | Farinacci et al. |
| 2012/0246282 A1 | 9/2012 | Oguchi |
| 2012/0254353 A1 | 10/2012 | Baba et al. |
| 2013/0070776 A1 * | 3/2013 | Sato ................ H04L 45/586 370/401 |
| 2013/0173788 A1 | 7/2013 | Song |
| 2013/0232492 A1 * | 9/2013 | Wang ............... H04L 61/2084 718/1 |
| 2014/0096183 A1 | 4/2014 | Jain et al. |
| 2014/0269709 A1 | 9/2014 | Benny et al. |

FOREIGN PATENT DOCUMENTS

| | | |
|---|---|---|
| CN | 102546389 A | 7/2012 |
| CN | 102710509 | 10/2012 |
| CN | 102932254 | 2/2013 |
| WO | 2013/067872 A1 | 5/2013 |

OTHER PUBLICATIONS

Extended European Search Report, EP Application No. 14784671.1, dated Nov. 15, 2016, pp. 1-9, EPO.

International Search Report and Written Opinion dated Jul. 2, 2014, PCT Patent Application No. PCT/CN2014/075171 dated Jul. 2, 2014, State Intellectual Property Office P R China.

M. Sridharan et al., "NVGRE: Network Virtualization using Generic Routing Encapsulation," Feb. 25, 2013, pp. 1-17, Internet Draft, IETF Trust.

Nabil Bitar et al., "Cloud Networking: VPN Applicability and NVo3 Gap Analysis," Oct. 22, 2012, pp. 1-62, Internet Draft, IETF Trust.

So, et al., "Requirements and Framework of VPN-oriented Data Center Services", The Internet Engineering Task Force (IETF), Sep. 8, 2011.

International Preliminary Report on Patentability received for PCT Patent Application No. PCT/CN2014/075171, dated Oct. 29, 2015, 08 pages.

\* cited by examiner

VIRTUAL MACHINE MIGRATION

CROSS-REFERENCE TO RELATED APPLICATION(S)

The present application is a US Divisional patent application claiming priority under 35 USC § 120 from co-pending U.S. patent application Ser. No. 14/768,443 filed on Aug. 17, 2015 by Song et al. and entitled VIRTUAL MACHINE MIGRATION which is a 371 patent application of PCT/CN2014/075171 filed on Apr. 11, 2014 which claims priority to Chinese Patent Application No. 201310132255.9 filed Apr. 16, 2013, the full disclosures each of which are hereby incorporated by reference.

BACKGROUND

A multi-site network (MSN) typically includes a core network that may be a public network and a site network that may be a private network. The site network typically includes an edge network and an access network, and is connected to the core network through the edge network. The edge network is typically designated as the network between a convergence device and an edge device, and the access network is typically designated as the network between an access device and the convergence device. The MSN also includes an overlay network that is a virtual network created between edge devices of site networks for providing a Layer 2 interconnection between the site networks. The MSN may be used to connect multiple geographically dispersed data centers to share load.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
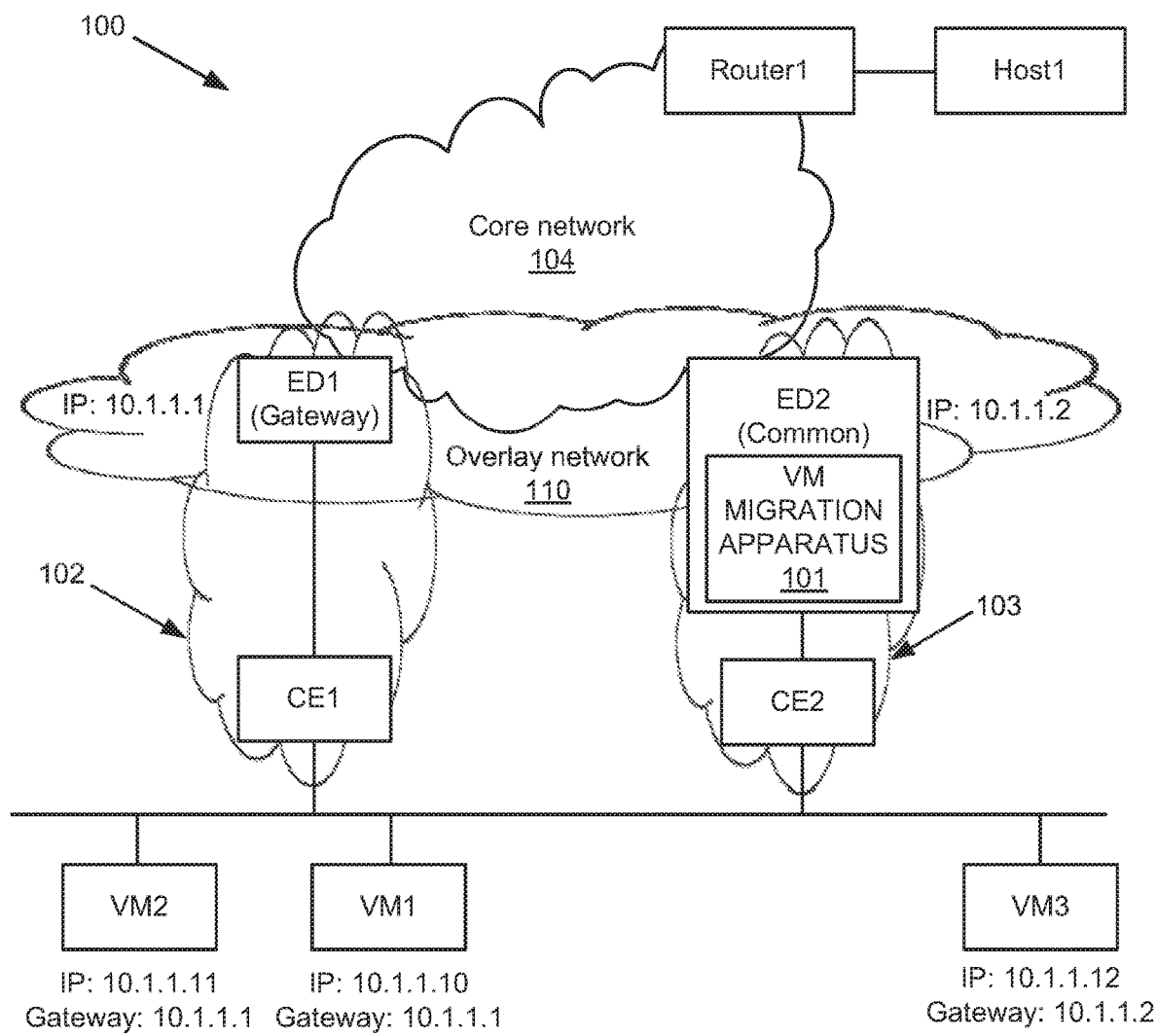
FIG. 1 illustrates a MSN including a VM migration apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Examples of a VM migration apparatus and a method for VM migration are disclosed herein for implementing migration of VMs, for example, in a MSN. A MSN may include a plurality of geographically dispersed network sites, e.g., local area networks (LANs), that are interconnected by a wide area network (WAN), such that the plurality of geographically dispersed network sites together act similarly to a single LAN.

At least one of a plurality of edge devices (EDs) of the MSN may be configured as a gateway ED, with the remaining EDs being designated as common EDs. Redundant tunnels may be generated between the gateway ED and each of the common EDs. The redundant tunnels may be redundant Internet protocol (IP) generic routing encapsulation (GRE) tunnels. The gateway ED may forward IP messages between a core network and a site network of the MSN. The redundant tunnels generated between the gateway ED and the common EDs may be used to carry the IP messages to provide seamless migration of VMs in the MSN.

According to an example, the gateway ED and one of the common EDs may implement an Ethernet virtualization interconnection (EVI) over the MSN. In another example, the gateway ED and one of the common EDs may implement an Overlay Transport Virtualization (OTV) technique. In these examples, the MSN may be construed as employing EVI and/or OTV. EVI, for instance, may be used to implement a Layer 2 virtual private network (L2VPN) technique based on an IP core network. A VPN instance may be established among different EDs. According to an example, an overlay network may be used to facilitate virtual local area network (VLAN) expansion across geographically dispersed sites. The overlay network generally includes an overlay interface and virtual links to carry Layer 2 traffic between sites. For example, the virtual links may be any communication channels over a Layer 3 core network. In one example, a physical communication medium may be virtualized to include multiple communication channels such that traffic of one communication channel is separated from that of a different communication channel (e.g., using a suitable identifier). The virtual link may be a Layer 2 virtual link (e.g., virtual Ethernet link) tunneled through the Layer 3 network using any suitable protocol (e.g., EVI, GRE, etc.). Layer 2 traffic between sites may be encapsulated with an IP header ("MAC in IP") to reach its destination via the core network. Traffic may be forwarded in the core network based on the IP header.

According to an example, the VM migration apparatus disclosed herein may include a processor, and a memory storing machine readable instructions that when executed by the processor cause the processor to generate a redundant tunnel between a common ED of a plurality of common EDs of a MSN and a gateway ED of the MSN. The machine readable instructions may further cause the processor to configure a gateway media access control (MAC) address and a static route for forwarding an IP message between the common ED and the gateway ED using the redundant tunnel. The machine readable instructions may further cause the processor to configure the static route to include a next hop IP address of the static route as a gateway IP address, and an outgoing interface of the static route as the redundant tunnel.

By using the gateway ED of the MSN as a single gateway for the MSN, a VM of the MSN may be seamlessly migrated between different site networks. For example, a host in a core network of the MSN may not perceive the migration of a VM. Further, a migrated VM may not need to update its access gateway address during the migration process.

FIG. 1 illustrates a MSN 100 including a VM migration apparatus 101, according to an example of the present disclosure. According to an example, the MSN 100 may be an EVI network, an OTV network, etc. The simplified configuration of the MSN 100 illustrated in FIG. 1 is provided for facilitating a description of the operation of the VM migration apparatus 101. The MSN 100 may include other devices including, such as other servers, EDs, routers, switches, etc.

Referring to FIG. 1, the MSN 100 may generally include site networks 102 and 103, a core network 104, and an overlay network 110. The site network 102 may include a VM1 (e.g., a server 1) and a VM2 (e.g., a server 2) connected under customer edge (CE) 1. The VM1 and the VM2 may be connected to the core network 104 through an ED1. In the example of FIG. 1, the VM1 may include an IP address 10.1.1.10 and a gateway address 10.1.1.1, the VM2 may include an IP address 10.1.1.11 and a gateway address 10.1.1.1, and the ED1 may include an IP address 10.1.1.1. A site network 103 may include a VM3 connected under CE2. The VM3 may be connected to the core network 104 through an ED2. In the example of FIG. 1, the VM3 may include an IP address 10.1.1.12 and a gateway address 10.1.1.2, and the ED2 may include an IP address 10.1.1.2.

The core network 104 may include a router1 and a host1 connected to the router1. A MSN link (e.g., EVI link, OTV link, etc.) may be provided between ED1 and ED2 that are interconnected via the core network 104. As described in further detail herein, the ED1 may be designated as a gateway ED, and the ED2 may be designated as a common ED. Operation of the VM migration apparatus 101 in conjunction with the MSN 100 is described in further detail with reference to FIGS. 2 and 3. Further, each common ED (e.g., ED2) may include an implementation of the VM migration apparatus 101 for performing the operations described herein with reference to FIGS. 1-3.

The overlay network 104 may be a virtual network established between the EDs (e.g., ED1 and ED2) of the site networks 102 and 103. The overlay network 104 may provide a Layer 2 interconnection between the site networks 102 and 103 (and other site networks), may realize extensions of VLANs among different site networks, may carry Layer 2 data flows of extended VLANs among the site networks 102 and 103 on a data plane, may announce among the site networks 102 and 103, the MAC address reachability information of all host devices and switching devices connected to the EDs (e.g., ED1 and ED2) through an interior gateway protocol (IGP) on a control plane, and may interconnect a plurality of site networks to form a larger Layer 2 forwarding domain.

Figure 2:
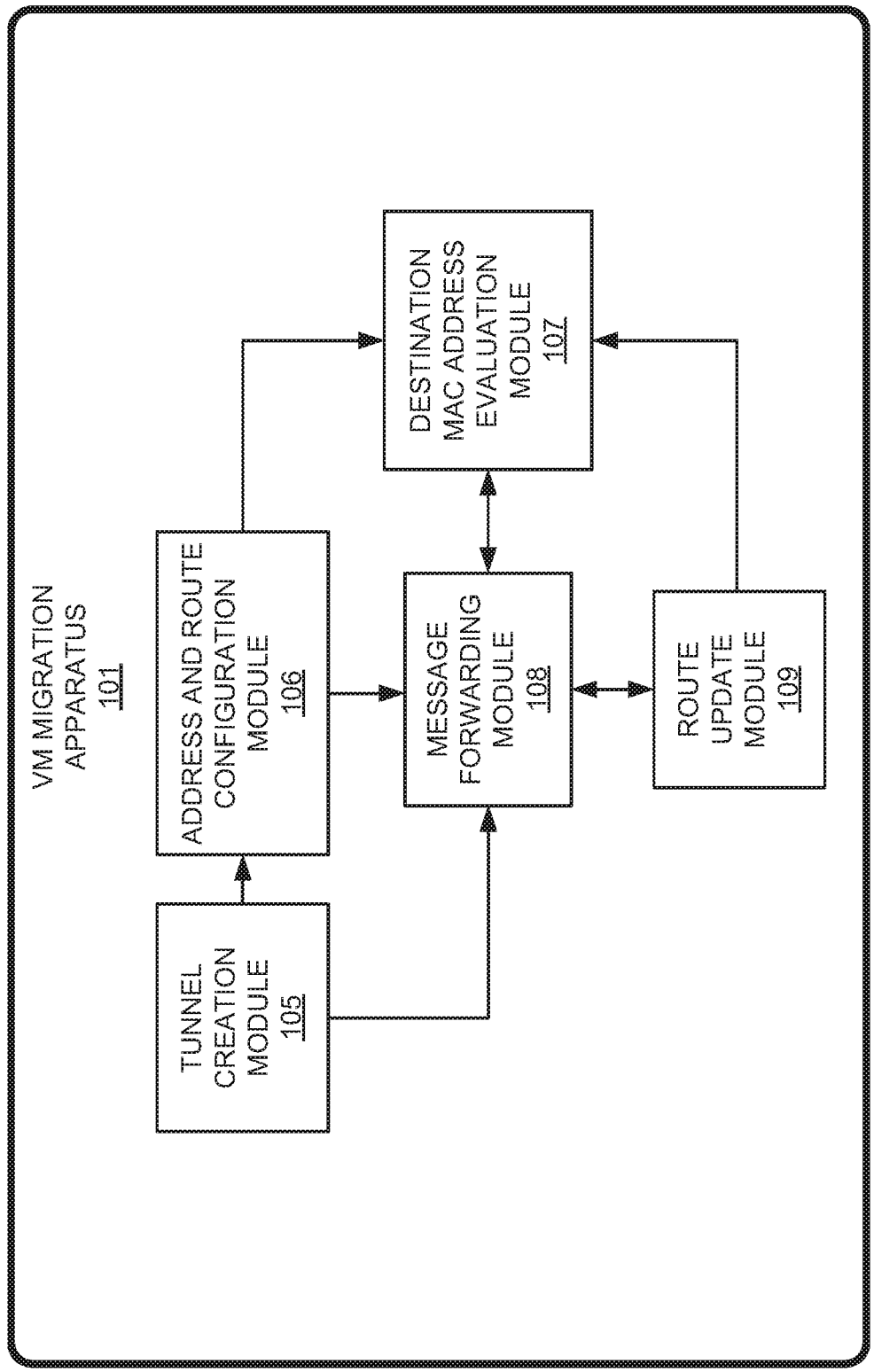
FIG. 2 illustrates further details of the VM migration apparatus of FIG. 1, according to an example of the present disclosure.

FIG. 2 illustrates further details of the VM migration apparatus 101, according to an example of the present disclosure. The VM migration apparatus 101 may generally include a tunnel generation module 105 to generate a redundant tunnel (e.g., a redundant IP GRE tunnel) between the common EDs (e.g., the ED2 for the example of FIG. 1) to the gateway ED (e.g., the ED1 for the example of FIG. 1), for carrying an IP message between the common EDs and the gateway ED. The redundant tunnel in the MSN domain may provide the link between the common EDs and the gateway ED. In other words, with respect to the common EDs and the gateway ED, in addition to creating a link tunnel for carrying Ethernet messages, the redundant tunnel that is created may be used to carry IP messages. The redundant tunnel may provide for forwarding of all IP message exchanges between the site networks 102, 103, and the core network 104, through the gateway ED. The gateway ED may be responsible for releasing routes of VMs in each of the site networks 102, 103, to the core network 104.

An address and route configuration module 106 may configure a gateway MAC address (i.e., gateway ED MAC address) and a static route for forwarding the IP message using the redundant tunnel between the appropriate common ED and the gateway ED. The gateway MAC address may be used to determine whether to forward the IP message using the redundant tunnel. The configured static route may be used to send the IP message into the redundant tunnel when it is needed to forward the IP message through the redundant tunnel. For the static route, the next hop IP address of the static route may be a gateway IP address, with the outgoing interface being the redundant tunnel.

A destination MAC address evaluation module 107 may determine whether a destination MAC address of the IP message originating from the site of the common ED and received by a message forwarding module 108 is a gateway MAC address.

Based on a determination by the destination MAC address evaluation module 107 that the destination MAC address of the IP message originating from the site of the common ED and received by the message forwarding module 108 is a gateway MAC address, the message forwarding module 108 may forward the IP message via the redundant tunnel to the gateway ED according to the static route. The gateway ED may forward the IP message according to a local route table of the gateway ED. Otherwise, based on a determination by the destination MAC address evaluation module 107 that the destination MAC address of the IP message is not a gateway MAC address, the message forwarding module 108 may forward the IP message according to the destination MAC address of the IP message.

The message forwarding module 108 may further receive a free address resolution protocol (ARP) message sent by a VM migrated to the site where the common ED is located (e.g., see FIGS. 1 and 3, VM1 migrated from ED1 to ED2), and send the free ARP message to the gateway ED. The gateway ED may use the free ARP message to update the local route table for the gateway ED. The gateway ED may further forward any IP message, whose destination IP address is the IP address of the VM migrated to the site where the common ED is located and whose destination MAC address is the gateway MAC address, from the core network 104 to the common ED through the redundant tunnel. When sending the free ARP message to the gateway ED, the message forwarding module 108 may send the free ARP message to each of the common EDs so that they can update their local route tables.

A route update module 109 may update the local route table of the respective common ED (i.e., the common ED for each respective implementation of the VM migration apparatus 101) when the message forwarding module 108 receives the free ARP message sent by a VM migrated to the site where the common ED is located. When the destination MAC address evaluation module 107 determines that the destination MAC address of the IP message that is received by the message forwarding module 108 and that originates from the site of the common ED is the gateway MAC address, the route update module 109 may determine if there is an ARP table entry corresponding to the destination MAC address. The route update module 109 may further generate a free ARP message whose source IP address and source MAC address are the source IP address and source MAC address, respectively, of the IP message, if there is a corresponding ARP table entry, and the outgoing interface of the ARP table entry is a link outgoing interface. The message forwarding module 108 may forward the free ARP message generated by the route update module 109 to the gateway ED. The gateway ED may update the local route table and forward the IP message, whose destination IP address is the source IP address of the IP message and whose destination MAC address is the gateway MAC address, from the core network 104 to the common ED through the redundant tunnel.

As described herein, the modules and other elements of the apparatus 101 may be machine readable instructions stored on a non-transitory computer readable medium. In addition, or alternatively, the modules and other elements of the apparatus 101 may be hardware or a combination of machine readable instructions and hardware.

Figure 3:
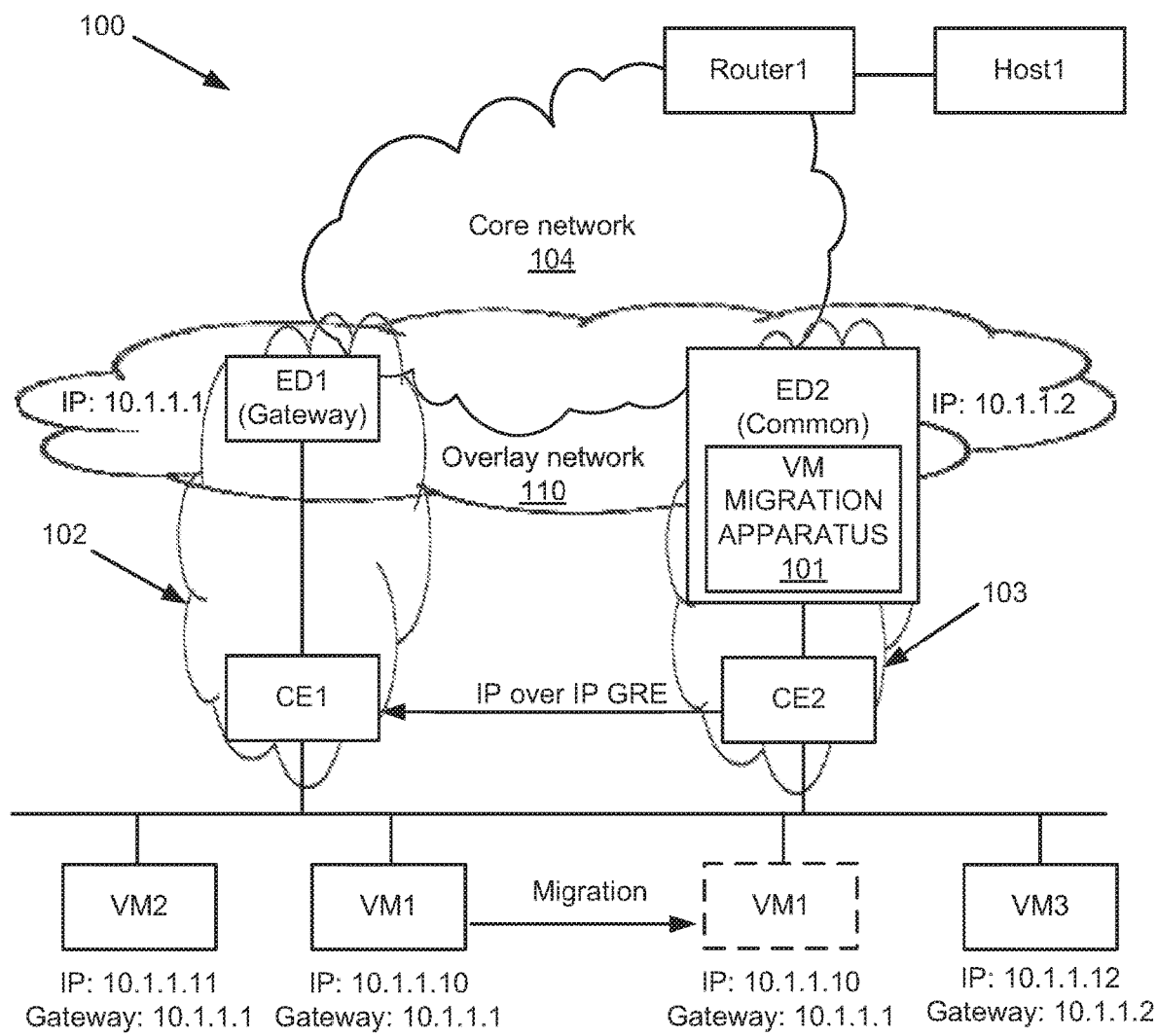
FIG. 3 illustrates the MSN of FIG. 1, illustrating migration of a VM, according to an example of the present disclosure.

Referring to FIGS. 1-3, FIG. 3 illustrates migration of the VM1 from the site network 102 to the site network 103. For the example of FIG. 3, the host1 and the VM1 may access each other through ping. Based on the network configuration by the tunnel generation module 105, the ED1 may be configured as the gateway of the MSN 100, so that the ED1 becomes the single gateway in the MSN 100.

Referring to FIGS. 1 and 3, before migration of the VM1 to the site network 103 including the common ED2, VM1 may be located in the site network 102 including the gateway ED1. The gateway ED1 may ascertain the ARP table entry corresponding to the VM1. Further, the VM1 may ascertain the ARP table entry corresponding to the gateway ED1, with the default gateway IP address being the IP address 10.1.1.1 of the gateway ED1.

Next, with respect to the VM1 before migration to the site network 103, the gateway ED1 may release a network segment route 10.1.1.1 to the core network 104.

Next, with respect to the VM1 before migration to the site network 103, the router1 may ascertain the network segment route 10.1.1.1, with the next hop thereof being the gateway ED1.

The process for access of the VM1 by the host1 may include the host1 sending a ping message whose source IP address is the IP address of the host1, and whose destination IP address is the IP address of the VM1.

Next, with respect to the VM1 before migration to the site network 103, the router1 may forward the ping message to the gateway ED1 on which the ARP table entry corresponding to VM1 already exists. Further, the gateway ED1 may perform an IP forwarding to forward the ping message to the VM1.

Next, with respect to the VM1 before migration to the site network 103, the VM1 may return a ping response message whose destination MAC address is the MAC address of the gateway ED1 (i.e., gateway MAC address), and whose destination IP address is the IP address of the host1.

Next, with respect to the VM1 before migration to the site network 103, the gateway ED1 may receive the ping response message, and may forward the ping response message according to the local route table for the gateway ED1.

Finally, with respect to the VM1 before migration to the site network 103, the router1 may perform an IP forwarding after receiving the ping response message to forward the ping response message to the host1.

Referring to FIGS. 1 and 3, after migration of the VM1 to the site network 103, the default gateway IP address of the VM1 remains at 10.1.1.1. Further, the gateway ED1 may release a network segment route 10.1.1.1 to the core network 104. The router1 in the core network 104 may ascertain the route of 10.1.1.1, with the next hop thereof being the gateway ED1. Further, after migration of the VM1 to site network 103, the VM1 may send a free ARP message which is intercepted by the common ED2 and sent to the gateway ED1. The free ARP message may be used by the gateway ED1 to update the ARP table entry and local route table corresponding to the migrated VM1. After migration of the VM1 to the site network 103, if an IP message is sent outside of the site network 103 by the common ED2, the ED2 may ascertain the source MAC address of the IP message to generate a free ARP message to be sent to the gateway ED1.

Referring to FIGS. 1 and 3, after migration of the VM1 to the site network 103, the process for access of the VM1 by the host1 through ping may include the host1 sending a ping message whose source IP address is the IP address of the host1 and whose destination IP address is the IP address of the VM1.

Next, with respect to the VM1 after migration to the site network 103, the router1 may forward the ping message to the gateway ED1. This is because, at this stage, the common ED2 has not released a route outside of the site network 103, and the router1 still ascertains that the next hop of the network segment route 10.1.1.1 is the gateway ED1.

Next, with respect to the VM1 after migration to the site network 103, the gateway ED1 may receive the ping message and perform a look up in the local route table to determine the next hop of the route for the ping message is the common ED2. Further, the gateway ED1 may determine that the outgoing interface of the common ED2 is the link outgoing interface. These determinations by the gateway ED1 may trigger an IP forwarding to encapsulate the ping message in an IP over IP GRE format to be sent to the common ED2.

Next, with respect to the VM1 after migration to the site network 103, the common ED2 may receive the ping message encapsulated in the IP over IP GRE format. The common ED2 may unencapsulate the ping message from its IP GRE tunnel, and forward the unencapsulated ping message to the VM1.

Next, with respect to the VM1 after migration to the site network 103, the VM1 may generate and return a ping response message to the common ED2.

Next, with respect to the VM1 after migration to the site network 103, the common ED2 may receive the ping response message, since the destination MAC address of the ping response message is the gateway MAC address (i.e., MAC address of the gateway ED1) of the MSN instance (e.g., EVI instance, OTV instance, etc.). A matching policy may redirect the ping response message to the static route. The ping response message may be encapsulated in the IP over IP GRE format according to the configured static route. The encapsulated ping response message may be forwarded to the gateway ED1.

Next, with respect to the VM1 after migration to the site network 103, the gateway ED1 may receive the encapsulated ping response message. The gateway ED1 may unencapsulate the ping message from its IP GRE tunnel, and may further forwards the unencapsulated ping response message to the core network 104 according to the local route table.

Finally, with respect to the VM1 after migration to the site network 103, the router1 may perform an IP forwarding after receiving the ping response message to forward the ping response message to the host1.

Generally, when VMs (e.g., the VM1, VM2, or VM3) of a site network (e.g., the site networks 102, 103) are to access a user device (e.g., the host1) of a core network (e.g., the core network 104), the VMs may forward an IP message. For the IP message, the destination IP address may be the IP address of the user device of the core network, and the destination MAC address (i.e., next hop MAC address) may be the gateway MAC address. When the IP message reaches an ED of the site network of the forwarding VM, if the ED is the gateway ED (e.g., the ED1 of the site network 102), then the gateway ED may directly forward the IP message to the user device in the core network according to the local route table of the gateway ED. However, if the ED is a common ED (e.g., the ED2 of the site network 103), based upon a determination that the destination MAC address of the IP message is the gateway MAC address, the common ED may forward the IP message to the gateway ED through the redundant tunnel according to the configured static route. Upon receiving the IP message forwarded through the redundant tunnel, the gateway ED may forward the IP message to the user device in the core network according to the local route table of the gateway ED.

Further, with respect to migration of a VM (e.g., the VM1 of the site network 102) to a new site network (e.g., to the site network 103), the migrated VM may send a free ARP message. For the new site network, an ED of the new site network may intercept the free ARP message, and update its local ARP table entries and route table according to the free ARP message. If the ED of the new site is a common ED, the ED of the new site may forward the free ARP message to the gateway ED through an Ethernet over IP GRE tunnel to the gateway ED. Upon receiving the free ARP message, the gateway ED may update its local ARP table entries and route table according to the free ARP message. Since the free ARP message is forwarded to the gateway ED through the original IP GRE tunnel, after the gateway ED updates the corresponding local ARP table entries according to the free ARP message, the outgoing interface in the local ARP table entries may be the link outgoing interface. The free ARP message may also be forwarded to the rest of the common EDs through the Ethernet over IP GRE tunnels to each of the rest of the common EDs. Accordingly, the rest of the common EDs may update their local ARP table entries and route tables based on the free ARP message.

For further operations, the gateway ED may receive an IP message sent by a user device (e.g., the host1) in the core network 104. The IP message may include a destination IP address as the IP address of a VM and a destination MAC address as the gateway MAC address. For such an IP message, the gateway ED may perform an IP forwarding within the MSN according to the local route table of the gateway ED to forward the IP message to the ED of the new site network through the redundant tunnel. The ED of the new site network may further forward the IP message to the VM of the new site network.

With respect to the free ARP message, in the event the free ARP message does not immediately reach the gateway ED after migration of the VM (e.g., the VM2) to the new site network (e.g., the site network 103), absent receipt of the free ARP message, the gateway ED may not update the local ARP table entries and route table in time. Thus, absent receipt of the free ARP message, for an IP message whose destination IP address is the IP address of the VM and whose destination MAC address is the gateway MAC address to the ED of the new site network, the gateway ED may not forward the IP message originating from the core network 104 to the ED of the new site network via the redundant tunnel. Further, such an IP message may not be sent by the new site network to the VM. To address such a situation, when the common ED receives the IP message whose destination MAC address is the gateway MAC address from the site of the common ED, the common ED may ascertain the MAC address of the IP message. Further, the common ED may determine whether there is an ARP table entry corresponding to the ascertained MAC address. Based on a determination that there is no ARP table entry corresponding to the ascertained MAC address, the common ED may ascertain that the device sending the IP message is not a VM newly migrated to the site network of the common ED, and the MAC address may be released. Alternatively, based on a determination that there is an ARP table entry corresponding to the ascertained MAC address and the outgoing interface of the ARP table entry is the link outgoing interface, the common ED may ascertain that the corresponding ARP table entry is ascertained from another site network. Thus, the common ED may ascertain that the device sending the IP message is a VM newly migrated to the site network of the common ED. In this case, a free ARP message may be generated for the VM newly migrated to the site network of the common ED. For the free ARP message, the source IP address and source MAC address may be the IP address and MAC address, respectively, of the VM newly migrated to the site network of the common ED. Further, the free ARP message may be sent to the gateway ED. Upon receipt of the free ARP message, the gateway ED may update its local ARP table entries and route table according to the free ARP message. Further, the gateway ED may forward the IP message from the core network to the common ED through the redundant tunnel according to its local route table. For the IP message, the destination IP address may be the IP address of the VM and the destination MAC address may be the gateway MAC address. When the common ED forwards the free ARP message to the gateway ED, the common ED may also send the free ARP message to each of the rest of the common EDs. The remaining common EDs may thereby update the local ARP table entries and route tables to ensure message exchange between the site networks.

Figure 4:
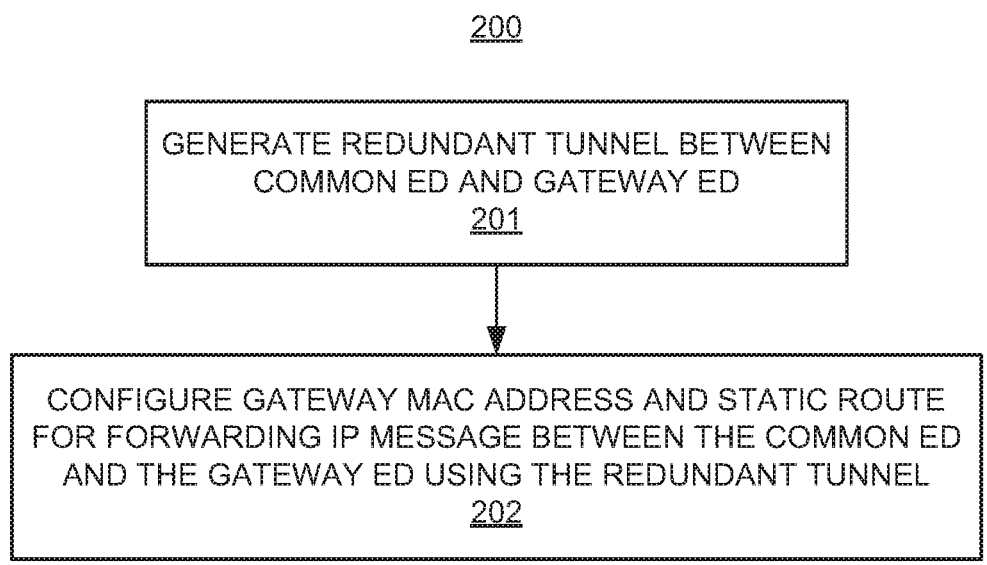
FIG. 4 illustrates a method for VM migration, according to an example of the present disclosure.
Figure 5:
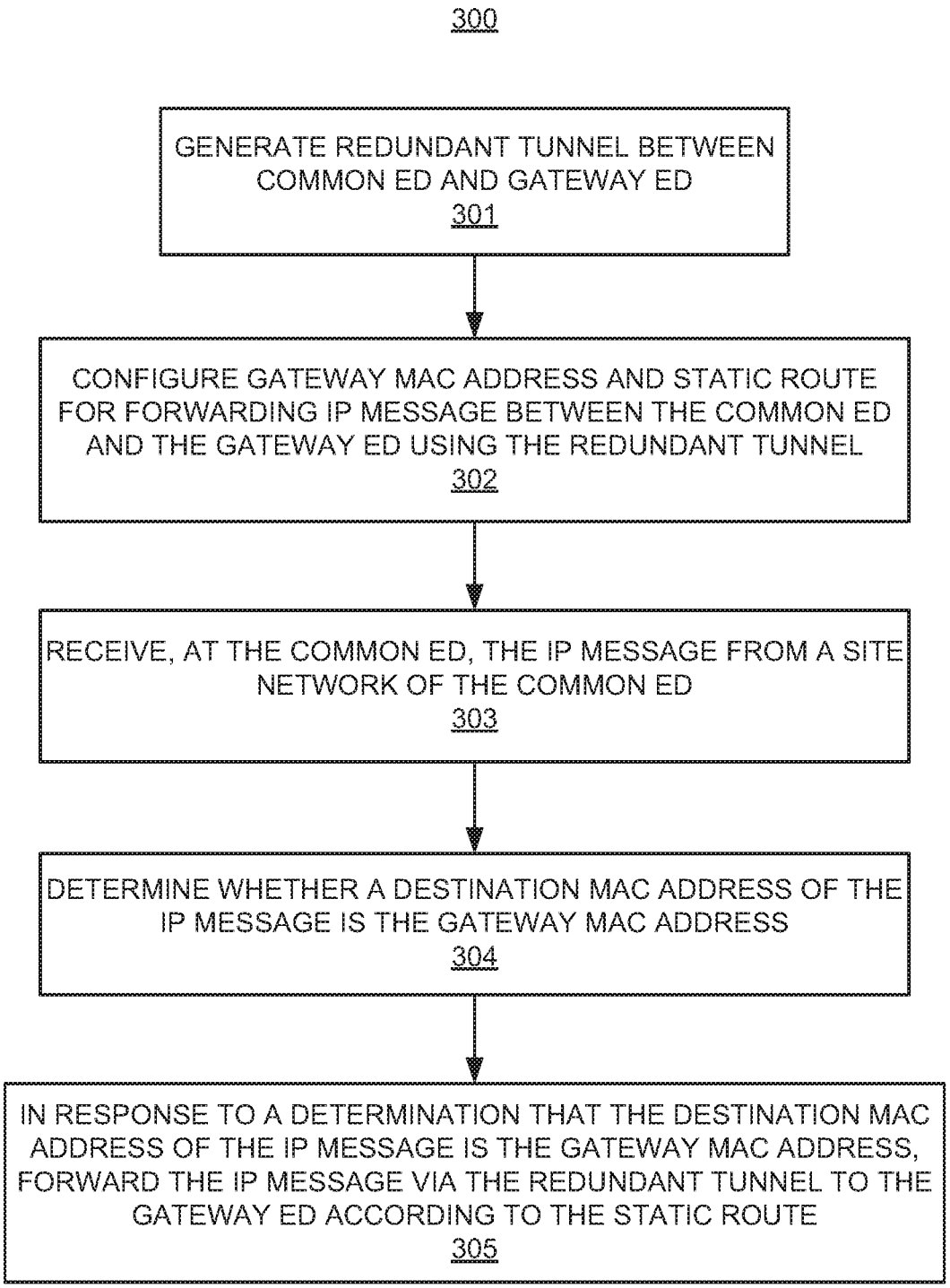
FIG. 5 illustrates further details of the method for VM migration, according to an example of the present disclosure.

FIGS. 4 and 5 respectively illustrate flowcharts of methods 200 and 300 for VM migration, corresponding to the example of the VM migration apparatus 101 whose construction is described in detail above. The methods 200 and 300 may be implemented on the VM migration apparatus 101 shown in FIGS. 1-3 by way of example and not limitation. The methods 200 and 300 may be practiced in another apparatus.

Referring to FIG. 4, for the method 200, at block 201, the method may include generating a redundant tunnel between a common ED of a plurality of common EDs of a MSN and a gateway ED of the MSN. For example, referring to FIGS. 1-3, the method may include generating a redundant tunnel between the common ED2 of the MSN 100 and the gateway ED1. As described herein, according to an example, the MSN 100 may be an EVI network, an OTV network, etc.

At block 202, a gateway MAC address and a static route are configured for forwarding an IP message between the common ED (e.g., ED2) and the gateway ED (e.g., ED1) using the redundant tunnel.

Referring to FIG. 5, for the method 300, at block 301, the method may include generating a redundant tunnel between a common ED of a plurality of common EDs of a MSN and a gateway ED of the MSN.

At block 302, a gateway MAC address and a static route are configured for forwarding an IP message between the common ED and the gateway ED using the redundant tunnel. According to an example, configuring a gateway MAC address and a static route for forwarding an IP message between the common ED and the gateway ED using the redundant tunnel may further include configuring the static route to include a next hop IP address of the static route as a gateway IP address, and an outgoing interface of the static route as the redundant tunnel.

At block 303, at the common ED, the IP message is received from a site network of the common ED. For example, referring to FIGS. 1-3, the method may include the method may include receiving, at the common ED2, the IP message from the site network 103.

At block 304, a determination is made as to whether a destination MAC address of the IP message is the gateway MAC address.

At block 305, in response to a determination that the destination MAC address of the IP message is the gateway MAC address, the method may include forwarding the IP message via the redundant tunnel to the gateway ED (e.g., the gateway ED1) according to the static route.

Other steps may be performed for VM migration. According to an example, the method may include using the gateway ED to forward the IP message according to a local route table of the gateway ED. According to an example, the method may include migrating the VM (e.g., the VM1) from a site network (e.g., the site network 102) associated with the gateway ED to another site network (e.g., the site network 103) associated with the common ED. According to an example, the method may include receiving a free ARP message from the migrated VM, and updating, at the common ED, a local route table of the common ED. The method may further include forwarding the free ARP message to the gateway ED, updating, at the gateway ED, a local route table of the gateway ED, and using the updated local route table of the gateway ED to forward the IP message from a core network (e.g., the core network 104) to the common ED. According to an example, the IP message may include a destination IP address as an IP address of the VM and a destination MAC address as the gateway MAC address.

According to an example, the method may include receiving the IP message including a destination MAC address as the gateway MAC address from a network site of the common ED (e.g., the common ED2), and determining whether there is an ARP table entry corresponding to the destination MAC address. Based on a determination that there is an ARP table entry corresponding to the destination MAC address, the method may further include determining whether an outgoing interface of the ARP table entry is a link outgoing interface. Based on a determination that the outgoing interface of the ARP table entry is the link outgoing interface, the method may further include generating a free ARP message whose source IP address and source MAC address are the source IP address and source MAC address, respectively, of the IP message. The method may further include forwarding the free ARP message to the gateway ED (e.g., the gateway ED1). According to an example, the method may include updating, at the gateway ED, a local route table of the gateway ED, and using the updated local route table of the gateway ED to forward the IP message from a core network to the common ED using the redundant tunnel. According to an example, the method may include forwarding the free ARP message to other common EDs of the plurality of common EDs, and updating, at the other common EDs, respective local route tables of the other common EDs.

According to an example, the method may include migrating the VM from a site network associated with the common ED to another site network associated with another common ED of the plurality of common EDs. According to an example, the method may include receiving a free ARP message from the migrated VM, and updating, at the another common ED, a local route table of the another common ED. The method may further include forwarding the free ARP message to the gateway ED, updating, at the gateway ED, a local route table of the gateway ED, and using the updated local route table of the gateway ED to forward the IP message from a core network to the another common ED.

Figure 6:
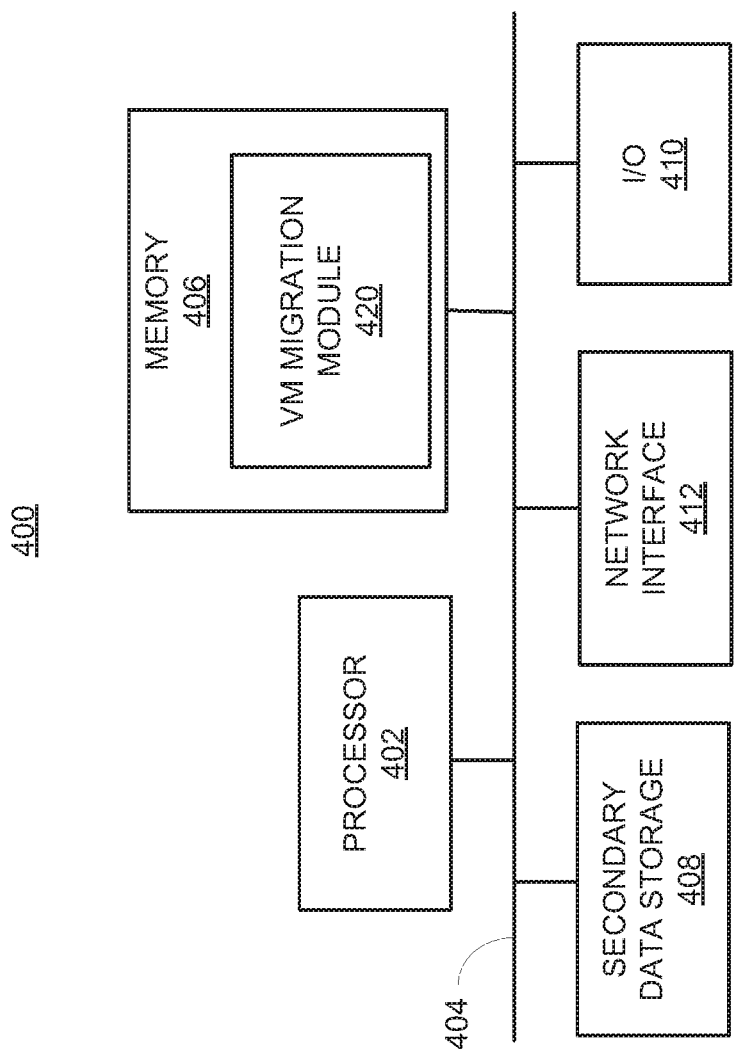
FIG. 6 illustrates a computer system, according to an example of the present disclosure.

FIG. 6 shows a computer system 400 that may be used with the examples described herein. The computer system may represent a generic platform that includes components that may be in a server or another computer system. The computer system 400 may be used as a platform for the apparatus 101. The computer system 400 may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include a VM migration module 420 including machine readable instructions residing in the memory 406 during runtime and executed by the processor 402. The VM migration module 420 may include the modules of the apparatus 101 shown in FIG. 1.

The computer system 400 may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A method, comprising:
   generating, by a processor, a redundant tunnel between a common edge device (ED) of a plurality of common EDs of a multi-site network (MSN) and a gateway ED of the MSN; and
   configuring a gateway media access control (MAC) address and a static route for forwarding an Internet protocol (IP) message between the common ED and the gateway ED using the redundant tunnel;
   receiving the IP message including a destination MAC address as the gateway MAC address from a network site of the common ED;

determining whether there is an address resolution protocol (ARP) table entry corresponding to the destination MAC address;
in response to a determination that there is an ARP table entry corresponding to the destination MAC address, determining whether an outgoing interface of the ARP table entry is a link outgoing interface;
in response to a determination that the outgoing interface of the ARP table entry is the link outgoing interface, generating a free ARP message whose source IP address and source MAC address are a source IP address and a source MAC address, respectively, of the IP message; and
forwarding the free ARP message to the gateway ED.

2. The method according to claim 1, comprising:
updating, at the gateway ED, a local route table of the gateway ED; and
using the updated local route table of the gateway ED to forward the IP message from a core network to the common ED using the redundant tunnel.

3. The method according to claim 1, comprising:
forwarding the free ARP message to other common EDs of the plurality of common EDs; and
updating, at the other common EDs, respective local route tables of the other common EDs.

4. The method according to claim 1, comprising:
migrating a virtual machine (VM) from a site network associated with the common ED to another site network associated with another common ED of the plurality of common EDs.

5. The method according to claim 4, comprising:
receiving a free address resolution protocol (ARP) message from the migrated VM;
updating, at the another common ED, a local route table of the another common ED;
forwarding the free ARP message to the gateway ED;
updating, at the gateway ED, a local route table of the gateway ED; and
using the updated local route table of the gateway ED to forward the IP message from a core network to the another common ED.

6. The method according to claim 1, wherein configuring a gateway MAC address and a static route for forwarding an IP message between the common ED and the gateway ED using the redundant tunnel comprises:
configuring the static route to include a next hop IP address of the static route as a gateway IP address, and an outgoing interface of the static route as the redundant tunnel.

7. The method according to claim 1, comprising:
receiving, at the common ED, the IP message from a site network of the common ED;
determining whether a destination MAC address of the IP message is the gateway MAC address; and
in response to a determination that the destination MAC address of the IP message is the gateway MAC address, forwarding the IP message via the redundant tunnel to the gateway ED according to the static route.

8. The method according to claim 7, comprising:
using the gateway ED to forward the IP message according to a local route table of the gateway ED.

9. The method according to claim 1, comprising:
migrating a virtual machine (VM) from a site network associated with the gateway ED to another site network associated with the common ED.

10. The method according to claim 9, comprising:
receiving a free address resolution protocol (ARP) message from the migrated VM;
updating, at the common ED, a local route table of the common ED;
forwarding the free ARP message to the gateway ED;
updating, at the gateway ED, a local route table of the gateway ED; and
using the updated local route table of the gateway ED to forward the IP message from a core network to the common ED.

11. The method according to claim 10, wherein the IP message includes a destination IP address as an IP address of the VM and a destination MAC address as the gateway MAC address.

12. An apparatus, comprising:
a processor; and
a memory storing machine readable instructions that when executed by the processor cause the processor to:
generate a redundant tunnel between a common edge device (ED) of a plurality of common EDs of a multi-site network (MSN) and a gateway ED of the MSN;
configure a gateway media access control (MAC) address and a static route for forwarding an Internet protocol (IP) message between the common ED and the gateway ED using the redundant tunnel; and
configure the static route to include a next hop IP address of the static route as a gateway IP address, and an outgoing interface of the static route as the redundant tunnel;
receive an IP message including a destination MAC address as the gateway MAC address from a network site of the common ED;
determine whether there is an address resolution protocol (ARP) table entry corresponding to the destination MAC address;
in response to a determination that there is an ARP table entry corresponding to the destination MAC address, determine whether an outgoing interface of the ARP table entry is a link outgoing interface;
in response to a determination that the outgoing interface of the ARP table entry is the link outgoing interface, generate a free ARP message whose source IP address and source MAC address are a source IP address and a source MAC address, respectively, of the IP message; and
forward the free ARP message to the gateway ED.

13. The apparatus according to claim 12, comprising machine readable instructions to cause the processor to:
receive, at the common ED, the IP message from a site network of the common ED;
determine whether a destination MAC address of the IP message is the gateway MAC address; and
in response to a determination that the destination MAC address of the IP message is the gateway MAC address, forward the IP message via the redundant tunnel to the gateway ED according to the static route.

14. The apparatus according to claim 12 comprising machine readable instructions to cause the processor to:
update, at the gateway ED, a local route table of the gateway ED; and
use the updated local route table of the gateway ED to forward the IP message from a core network to the common ED using the redundant tunnel.

15. The apparatus according to claim 14 comprising machine readable instructions to cause the processor to:

forward the free ARP message to other common EDs of the plurality of common EDs; and update, at the other common EDs, respective local route tables of the other common EDs.

16. A non-transitory computer readable medium having stored thereon machine readable instructions which, when executed, cause a processor to:

generate a redundant tunnel between a common edge device (ED) of a plurality of common EDs of a multi-site network (MSN) and a gateway ED of the MSN;

configure a gateway media access control (MAC) address and a static route for forwarding an Internet protocol (IP) message between the common ED and the gateway ED using the redundant tunnel;

receive, at the common ED, the IP message from a site network of the common ED;

determine whether a destination MAC address of the IP message is the gateway MAC address;

in response to a determination that the destination MAC address of the IP message is the gateway MAC address, forward the IP message via the redundant tunnel to the gateway ED according to the static route;

receive the IP message including a destination MAC address as the gateway MAC address from a network site of the common ED;

determine whether there is an address resolution protocol (ARP) table entry corresponding to the destination MAC address;

in response to a determination that there is an ARP table entry corresponding to the destination MAC address, determine whether an outgoing interface of the ARP table entry is a link outgoing interface;

in response to a determination that the outgoing interface of the ARP table entry is the link outgoing interface, generate a free ARP message whose source IP address and source MAC address are a source IP address and a source MAC address, respectively, of the IP message; and forward the free ARP message to the gateway ED.

17. The non-transitory computer readable medium according to claim 16 comprising machine readable instructions, that when executed, cause a processor to:

update, at the gateway ED, a local route table of the gateway ED; and use the updated local route table of the gateway ED to forward the IP message from a core network to the common ED using the redundant tunnel.

18. The non-transitory computer readable medium according to claim 17 comprising machine readable instructions, that when executed, cause a processor to:

forward the free ARP message to other common EDs of the plurality of common EDs; and update, at the other common EDs, respective local route tables of the other common EDs.

* * * * *